United States Patent
Nielsen

(10) Patent No.: US 7,415,894 B2
(45) Date of Patent: Aug. 26, 2008

(54) MAGNETIC INDUCTIVE FLOWMETER HAVING A PLUG-TYPE ELECTRODE CONNECTION

(75) Inventor: Søren Nielsen, Sønderborg (DK)

(73) Assignee: Siemens Aktiengesellschaft, Munich (DE)

( * ) Notice: Subject to any disclaimer, the term of this patent is extended or adjusted under 35 U.S.C. 154(b) by 112 days.

(21) Appl. No.: 10/550,228

(22) PCT Filed: Mar. 22, 2004

(86) PCT No.: PCT/EP2004/003019

§ 371 (c)(1),
(2), (4) Date: Nov. 3, 2006

(87) PCT Pub. No.: WO2004/083786

PCT Pub. Date: Sep. 30, 2004

(65) Prior Publication Data

US 2007/0163359 A1    Jul. 19, 2007

(30) Foreign Application Priority Data

Mar. 22, 2003  (DE)  ................... 103 12 824

(51) Int. Cl.
 *G01F 1/37*    (2006.01)

(52) U.S. Cl. .................................. 73/861.52
(58) Field of Classification Search ............... 73/861.52
 See application file for complete search history.

(56) References Cited

U.S. PATENT DOCUMENTS

| | | | |
|---|---|---|---|
| 3,203,238 A * | 8/1965 | Whittaker et al. | 73/197 |
| 4,149,315 A * | 4/1979 | Page et al. | 433/114 |
| 4,297,897 A | 11/1981 | Young | |
| 4,929,001 A * | 5/1990 | Phillips, II | 285/141.1 |
| 5,400,659 A | 3/1995 | Yokoi et al. | |
| 6,719,330 B2 * | 4/2004 | Brown et al. | 285/242 |
| 6,964,352 B2 * | 11/2005 | Werth | 222/146.6 |

FOREIGN PATENT DOCUMENTS

| | | |
|---|---|---|
| JP | 06 207841 A | 7/1994 |
| JP | 08 254450 A | 10/1996 |

* cited by examiner

*Primary Examiner*—Harshad Patel

(57) ABSTRACT

A magnetic inductive flowmeter having a measuring distance that is surrounded by a wall; a magnetic field generating device, and; an electrode device, which has at least one electrode on the inside of the wall and an electrode connection on the outside of the wall. The electrode connection is connected to the electrode by a plug-type connection, and the electrode connection fixes the electrode to the wall.

20 Claims, 3 Drawing Sheets

US 7,415,894 B2

MAGNETIC INDUCTIVE FLOWMETER HAVING A PLUG-TYPE ELECTRODE CONNECTION

CROSS REFERENCE TO RELATED APPLICATIONS

This application is the US National Stage of International Application No. PCT/EP2004/003019, filed Mar. 22, 2004 and claims the benefit thereof. The International Application claims the benefits of German application No. 10312824.7, filed Mar. 22, 2003, both applications are incorporated by reference herein in their entirety.

FIELD OF INVENTION

The invention relates to a magnetic inductive flowmeter comprising a measuring distance that is surrounded by a wall, a magnetic field generating device and an electrode device, which has at least one electrode on the inside of the wall and an electrode connection on the outside of the wall.

BACKGROUND OF THE INVENTION

A flowmeter of this type is known, for example, from U.S. Pat. No. 4,297,897. The measuring distance is normally formed by a tube. Two magnetic coils that generate a flow through the tube perpendicular to the direction of flow are disposed on the outside of the tube. Electrodes that have contact with the fluid are arranged at approximately 90° to the magnetic coils. A voltage between the two electrodes is dependent both on the strength of the magnetic field and on the speed of the fluid flowing through.

In the known case, the electrode is screwed into an inner thread of a fitting that is inserted through the wall of the tube. The fitting in turn has an outer thread onto which a nut is threaded. The fitting has an enlarged head on the inside of the wall, so that the wall is clamped between the head and the nut when a washer and a spring are interposed.

A further electrode array for a magnetic inductive flowmeter is known from EP 1 217 338 A2, in which the electrode has a shaft, which is routed through the wall of the measuring tube. The shaft has an outer thread onto which a nut is threaded in order to tighten the electrode to the wall.

The assembly cost is relatively high in such an embodiment. At least one, but in most cases several, screw connections are needed in order to fix the electrode in the wall of the measuring distance and in order to connect an electrical cable.

SUMMARY OF THE INVENTION

The object of the invention is to simplify the assembly.

This object is achieved by means of a flowmeter of the type described above, in which the electrode connection is connected to the electrode via a plug-type connection and the electrode connection fixes the electrode to the wall.

This embodiment has a number of advantages. The assembly is considerably simplified. Screw connections no longer have to be provided between the electrode connection and the electrode. This means that the assembly of the electrode array can be effected largely independently of the person who carries out the assembly. For example, it is not possible for excessive restraining moments to occur. The results of the assembly can therefore be reproduced more readily.

The plug-type connection is preferably configured inside the wall. The advantage of this is, firstly, that the electrode per se can be kept relatively small. It no longer needs to be inserted through the wall, but may terminate in the wall by means of an extension. This design is particularly effective in reducing costs if special and therefore expensive materials need to be used for the measurement in a special fluid, because only very little of the expensive material is required. The electrode connection may be formed from a different material because it is no longer in contact with the fluid. In addition, the plug-type connection is protected. Both the electrode and the electrode connection project into the wall, hence are at least partially routed. This makes the connection more stable.

The electrode connection is preferably surrounded, at least outside the wall, by a metallic shield. The electrode connection therefore has, so to speak, a protective housing that forms a Faraday cage. This is effective in suppressing spurious radiation from electrical or magnetic fields. This is particularly advantageous in a flowmeter in which the signal voltages that indicate the speed of the fluid flowing through are relatively small. It is possible, for example, for a shielded cable to be fed into a metallic shield of this type, said cable then being connected to the electrode connection inside the metallic shield. This connection may be prefabricated. The final assembly of the electrode in the wall is then easily effected by inserting the electrode into the wall from one side and inserting the electrode connection with its protective housing from the other side. When the plug-type connection is established between the electrode and the electrode connection, the electrode is then firmly held in the wall and the electrode connection is shielded.

The electrode preferably has one part of a barb connection, which holds it in position. This makes it possible to increase the forces with which the electrode is held in the wall, over and above simple frictional locking between the electrode and the electrode connection. A barb connection has an edge at the end of a conical surface that can interconnect to a mating component. For example, the edge can be pushed into the material that forms the wall.

The barb connection is preferably configured between the electrode and the electrode connection. This means that the wall is not burdened by the connection. In the event of a malfunction, it is possible simply to disconnect the connection and use a new electrode and electrode connection pairing, which can then once again securely form a barb connection because there are no corresponding impressions in the wall of the housing.

In this context it is particularly preferable for the barb connection to be designed as a snap connection in which a first connection element, which is designed as a spring, is locked into place behind a second connection element. A snap connection of this type permits positive locking, which enables far greater retaining forces to be used than a simple frictional lock even if the latter is reinforced by a sharp edge.

The first connection element is preferably configured as a ring with interruptions, which is surrounded by an annular spring. This ring has an inwardly projecting circumferential flange or—in any case—parts that project inward radially, which may be beveled on their upper surface. The annular spring, for example an elastic ring, allows the individual ring sections to be contorted outward radially when the connection is established. However, the sections are then pushed back again by the annular spring when the second connection element is locked in place.

The second connection element is preferably supported on the wall of a cylindrical hole. In this case, it is useful if the first connection element can be sprung radially inward. If the second connection element is supported on the wall of the cylindrical hole, this provides a further retention option so that the positioning of the electrode array in the wall is further improved.

In this context it is preferable for the second connection element to be configured on the electrode. The electrode is not contorted when the snap connection is established. This means, therefore, that there will be no concerns subsequently about malfunctions being caused by the electrode possibly being unintentionally contorted.

Preferably, a spring arrangement that stresses the electrode connection in a direction away from the electrode, acts upon the electrode connection. In this way the electrode is securely pulled against the inside of the wall. If a washer is provided between the electrode and the wall, then the forces of the spring arrangement have the effect of compressing said washer, thus improving the sealing efficiency. Particularly with regard to a snap connection, the retaining forces in the connection between the electrode and the electrode connection are increased. It is virtually impossible to accidentally loosen a snap connection under voltage.

In this context it is particularly preferable for the spring arrangement to act upon the shield and to push it against the outside of the wall. This provides a virtually interruption-free shield. The outside of the wall is provided with many layers of shielding foil, for example a copper foil. The spring arrangement therefore creates sufficient contact force between the shield and the shielding foil.

In this context it is preferable for the shield with a ring surface to be located outside the spring arrangement on the outside of the wall. The ring surface is relatively narrow and therefore small. This enables a relatively large amount of pressure to be achieved between the shield and the foil on the outside of the wall.

It is also advantageous if the electrode connection is in one piece and is connected directly to a signal conductor. This connection may be formed either by the signal conductor being extended in the electrode connection, or by the signal conductor being soldered, welded or glued to the electrode connection, or fastened to it by similar means. Subsequent fastening stages may be dispensed with. The electrical contact is improved.

The invention is described in greater detail below on the basis of preferred exemplary embodiments together with the drawings.

DETAILED DESCRIPTION OF INVENTION

Figure 1:
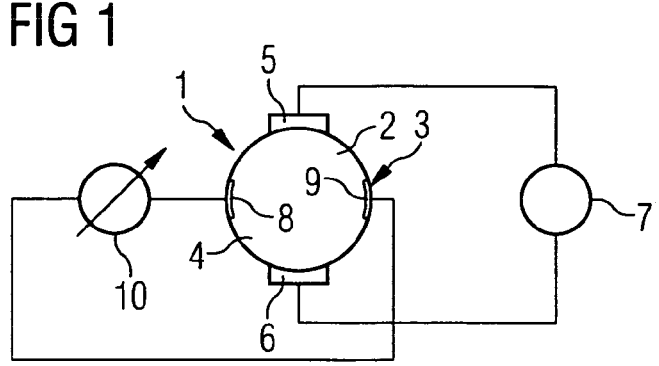
FIG. 1 shows a schematic diagram of a magnetic inductive flowmeter.

FIG. 1 shows a magnetic inductive flowmeter 1 with a measuring distance 2, through which a fluid may flow perpendicular to the plane of projection. The measuring distance is configured in the interior of a tube 3 with a wall 4. Two coils 5, 6 are connected to a power supply 7. When the coils 5, 6 are supplied with power, they generate a magnetic field that is oriented perpendicular to the direction of flow. Two electrode arrays 8, 9 are connected to an analysis device 10. When the coils 5, 6 generate a magnetic field and a fluid flows through the tube 3 perpendicular to the plane of projection, a voltage is created between the electrodes 8, 9. This voltage can be evaluated by the analysis device 10 and enables the mass flow of the fluid to be indicated.

Figure 2:
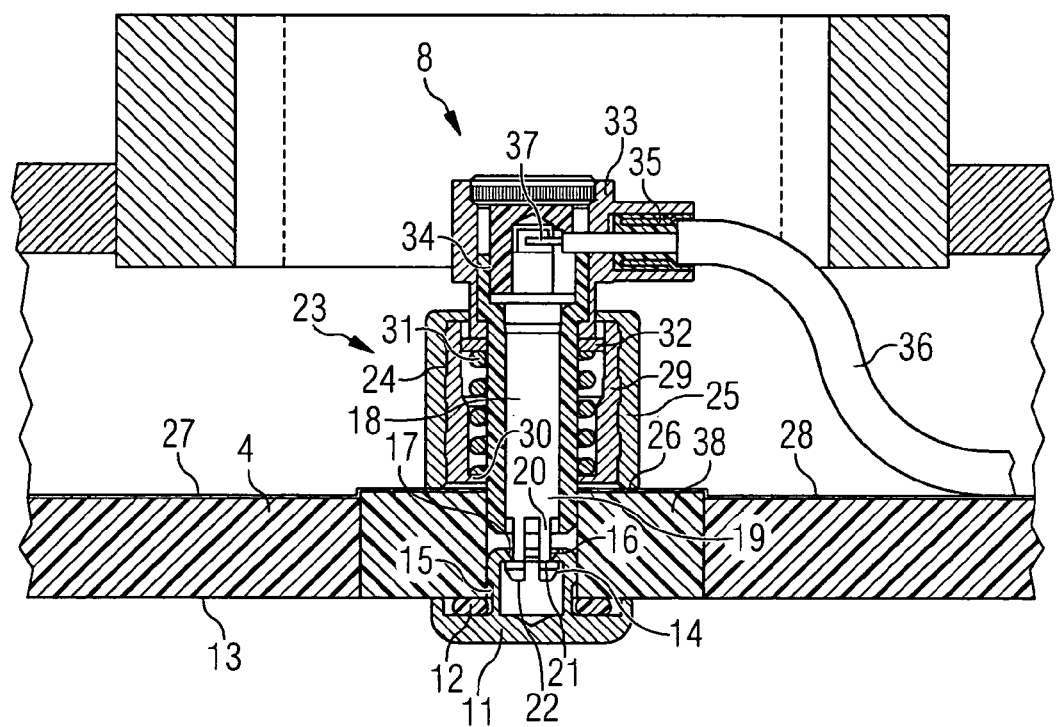
FIG. 2 shows a first embodiment of an electrode array.

FIG. 2 now shows such an electrode array 8 in greater detail.

The electrode array 8 has an electrode 11 which is arranged on the inside 13 of the wall 4 with a washer 12 interposed. The electrode 11 has an extension 14, which is plugged into an aperture 15 in the wall 4. The radial exterior of the extension 14 rests against the wall of the cylindrical hole 15. The end of the extension is shaped radially inward, so that a circumferential projection 16 is formed that has a beveled upper surface 17. The projection 16 thus forms an inner cone.

The lower end 19 of an electrode connection 18 is likewise inserted into the cylindrical hole 15. The electrode connection 18 has sprung fingers 20 at its end, said sprung fingers terminating in projections 21 that point outward radially. The projections 21 have a beveled end face 22.

The projections 21 of the electrode connection 18 grasp the projection 16 of the extension 14 of the electrode 11. This forms a snap connection between the electrode 11 and the electrode connection 18.

The electrode connection 18 has a shield 23 with a housing 24. The housing 24 has an outer ring 25, the end face 26 of which is disposed on the outside 27 of the wall 4. A copper foil 28 is laminated on the outside 27. Contact between the outer ring 25 and the copper foil 28 creates an electrically conductive connection between the housing 24 and the copper foil 28.

The housing 24 also has an inner ring 29, which is pressed into the outer ring 25. On the end of the inner ring 29 adjacent to the wall 4, there is an inward projection 30 on which a spring 31 is supported. The spring 31 acts upon a head 33 via a disk 32, said head 33 in turn acting on the upper end of the electrode connection 18 and thus forcing the electrode connection 18 away from the electrode 11. An insulating device 34 is disposed between the head 33 and the electrode connection 18, said insulating device extending into the cylindrical hole 15.

In the exemplary embodiment, the head 33 is shown to have a circumferential, inward projection in the area of the disk 32, said projection acting upon a step in the insulating device 34. The insulating device 34 has an enlarged diameter on which rests a corresponding enlarged diameter of the electrode connection. Fundamentally, all contact surfaces need only be capable of being subjected to pressure. Other embodiments are, however, clearly possible.

The head 33 is connected to a shield 35 of a shielded cable 36. The shielded cable 36 has a core 37 that is connected to the electrode connection 18, for example by soldering.

The upper end of the housing 24 encloses the head 33 as tightly as possible. However, a telescopic movement of the head 33 against the force of the spring 31 is still permitted in the housing 24.

The electrode connection 18, together with the housing 24, the spring 31, the head 33 and the cable 36 may be preassembled, for example by automatic handling devices.

To effect assembly of the electrode 11, the electrode 11 is inserted into the cylindrical hole 15 in the wall 4 from the inside 13. Since the electrode 11 is arranged with the outside of the extension 14 on the wall of the cylindrical hole 15, this produces a gentle frictional lock that ensures that the electrode 11 cannot fall out of the cylindrical hole 15.

The electrode connection 18 is inserted into the cylindrical hole from the opposite side, with the head 33 being pushed toward the electrode 11. If the end face 22 of the projections 21 on the fingers 20 then comes to rest on the upper end 17 of the extension 14, the fingers 20 are pushed radially inward such that the projections 21 on the end of the fingers 20 can adapt to the projection 16 on the extension 14. As soon as they have been moved past the extension 14, they spring back outward radially and become firmly hooked behind the projection 16 of the extension 14. If the head 33 is not then being pushed further against the force of the spring 31 toward the electrode 11, then the spring 31 can expand and pushes the electrode connection 18 away from the electrode 11 so that the projections 21 on the fingers 20 hook behind the projection 16 on the extension 14. This results initially in a positively locked connection between the electrode 11 and the electrode connection 18. The projections 21 are arranged in this connection with a force on the projection 16 that is sufficient to establish an electrical contact with the requisite degree of reliability.

At the same time the washer 12, as shown, is compressed so that the electrode 11 is also retained in the wall 4, with a fluid-tight seal.

The connection between the electrode 11 and the electrode connection 18 is effected in the middle of the wall 4. For this purpose the wall 4 may have a section 38 that is slightly thicker. The section 38 may be designed to be level on the outside 27, so that the end face 26 of the outer ring 25 may also be designed to be level. It is therefore not necessary to observe any specific orientation when the electrode connection 18 is inserted into the electrode 11.

Figure 3:
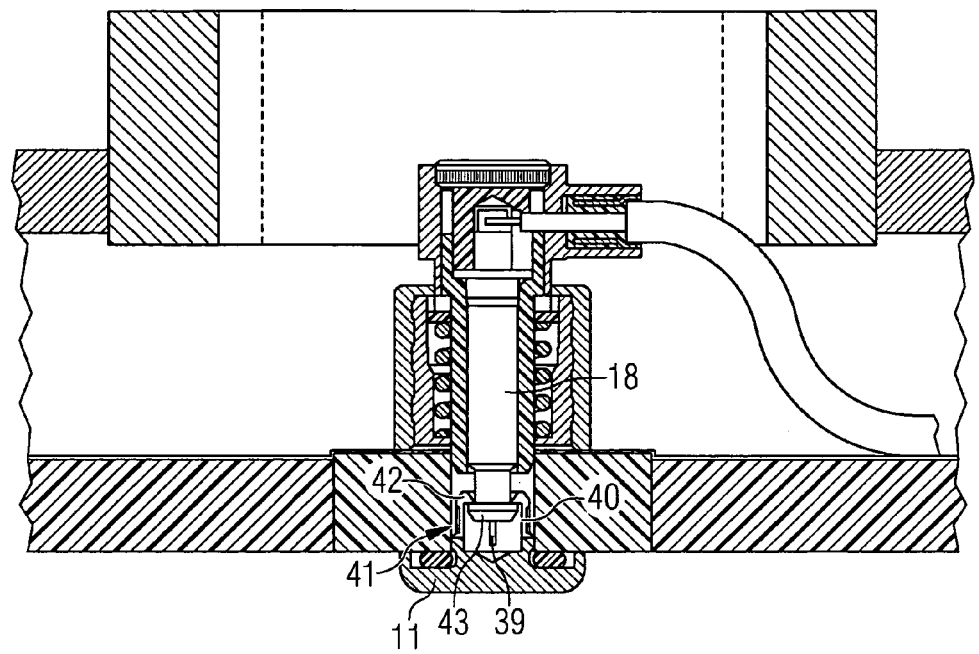
FIG. 3 shows a second embodiment of an electrode array.

The embodiment in FIG. 3 essentially corresponds to the embodiment in FIG. 2. The same components are therefore labeled with the same reference numbers. Unlike in the configuration according to FIG. 2, in the configuration according to FIG. 3 the electrode is provided with an extension 14, which has slots 39, permitting the formation of legs 40 that can spring outward. These legs 40 are retained inward radially by an annular spring 41, for example an elastic ring.

On the end of the legs 40 there is a beveled head 42, which also protrudes radially inward over the legs 40. A mating component 43 on the electrode connection 18 may then become hooked behind the heads 42 on the legs 40. A snap connection can also be established in this way.

Figure 4:
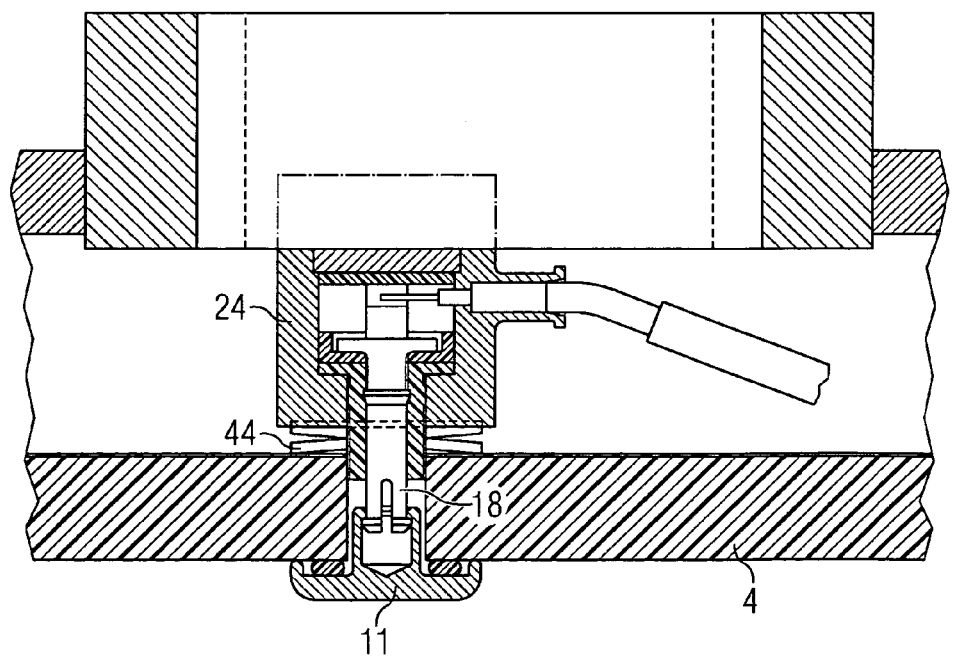
FIG. 4 shows a third embodiment of an electrode array.

FIG. 4 shows an embodiment in which a snap connection has been established between the electrode 11 and the electrode connection 18 in practically the same way as in FIG. 2. However, in this case a spring 44 is still disposed between the housing 24 and the wall 4. This is a disk spring so that electrical shielding is also present in the area between the housing 24 and the wall 4.

Figure 5:
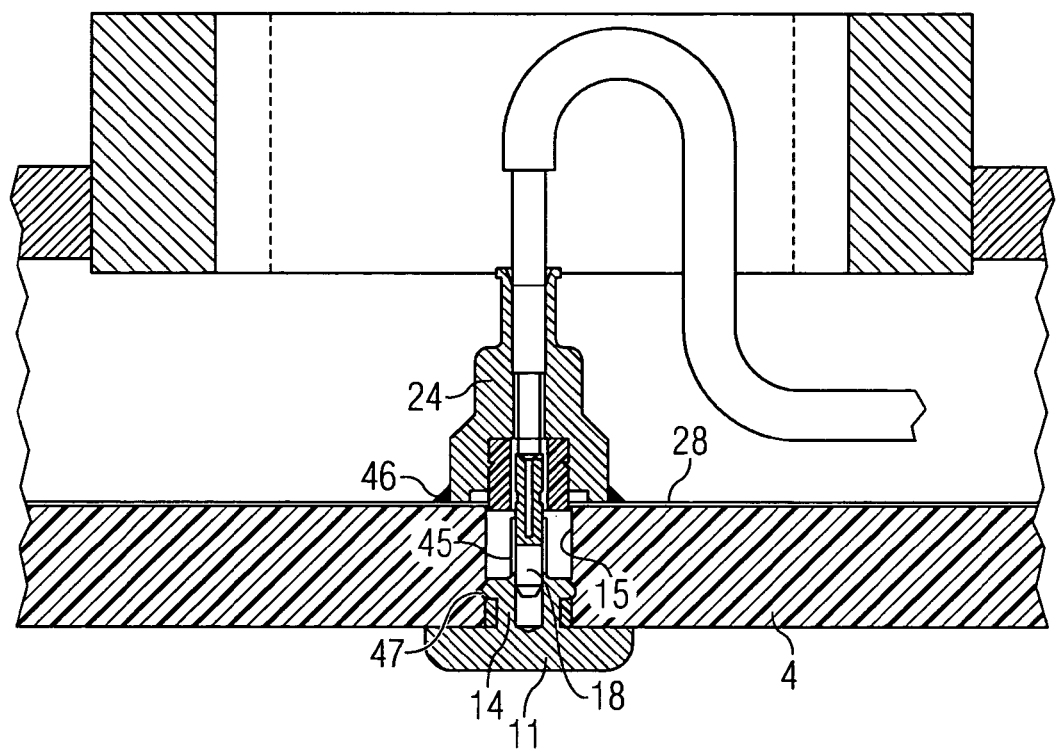
FIG. 5 shows a fourth embodiment of an electrode array.

In the embodiment according to FIG. 5, there is a simple plug connection between the electrode 11 and the electrode connection 18. The electrode 11 may have a sleeve extension 45 for this purpose, into which the electrode connection 18 is inserted, thus resulting an a relatively long contact surface.

The housing 24 is connected to the copper foil 28 via a soldered connection.

The extension 14 has a projection 47 that protrudes outward radially, the maximum outer diameter of said projection being slightly larger than the inner diameter of the cylindrical hole 15. When the electrode 11 is pushed into the cylindrical hole 15, the projection 47 "bites" firmly into the wall 4. In this embodiment the electrode is retained in the wall 4 by the projection 47. The housing 24 is positioned via the solder connection 46. For this reason the frictional locking of the plug connection between the electrode connection 18 and the sleeve extension 45 is sufficient.

The invention claimed is:

1. A magnetic inductive flowmeter, comprising:
 a measuring distance that is surrounded by a wall;
 a magnetic field generating device; and
 an electrode device, which has at least one electrode on the inside of the wall and an electrode connection on the outside of the wall, wherein
 the electrode connection is connected to the electrode via a plug-type connection, wherein
 the electrode connection fixes the electrode to the wall, and wherein
 the electrode has a part of a barb connection, which holds it in position.

2. The flowmeter according to claim 1, wherein the plug-type connection is configured inside the wall.

3. The flowmeter according to claim 2, wherein the electrode connection is surrounded by a metallic shield.

4. The flowmeter according to claim 2, wherein the barb connection is configured between the electrode and the electrode connection.

5. The flowmeter according to claim 2, wherein the electrode connection is in one piece and is connected directly to a signal conductor.

6. The flowmeter according to claim 1, wherein the electrode connection is surrounded by a metallic shield.

7. The flowmeter according to claim 6, wherein the electrode connection is surrounded outside the wall by the metallic shield.

8. The flowmeter according to claim 6, wherein the barb connection is configured between the electrode and the electrode connection.

9. The flowmeter according to claim 1, wherein the barb connection is configured between the electrode and the electrode connection.

10. The flowmeter according to claim 9, wherein the barb connection is designed as a snap connection, in which a first connection element, which is designed as a spring, is locked into place behind a second connection element.

11. The flowmeter according to claim 10, wherein the first connection element is configured as a ring with interruptions, wherein the ring is surrounded by an annular spring.

12. The flowmeter according to claim 11, wherein the second connection element is supported on the wall of a cylindrical hole.

13. The flowmeter according to claim 10, wherein the second connection element is supported on the wall of a cylindrical hole.

14. The flowmeter according to claim 13, wherein the second connection element is configured on the electrode.

15. The flowmeter according to claim 10, wherein a spring arrangement that stresses the electrode connection in a direction away from the electrode, acts upon the electrode connection.

16. The flowmeter according to claim 9, wherein a spring arrangement that stresses the electrode connection in a direction away from the electrode, acts upon the electrode connection.

17. The flowmeter according to claim 16, wherein the spring arrangement acts upon a metallic shield and pushes it against the outside of the wall.

18. The flowmeter according to claim 17, wherein a metallic shield with a ring surface is located outside the spring arrangement on the outside of the wall.

19. The flowmeter according to claim 16, wherein a metallic shield with a ring surface is located outside the spring arrangement on the outside of the wall.

20. The flowmeter according to claim 1, wherein the electrode connection is in one piece and is connected directly to a signal conductor.

* * * * *